Figure 1:
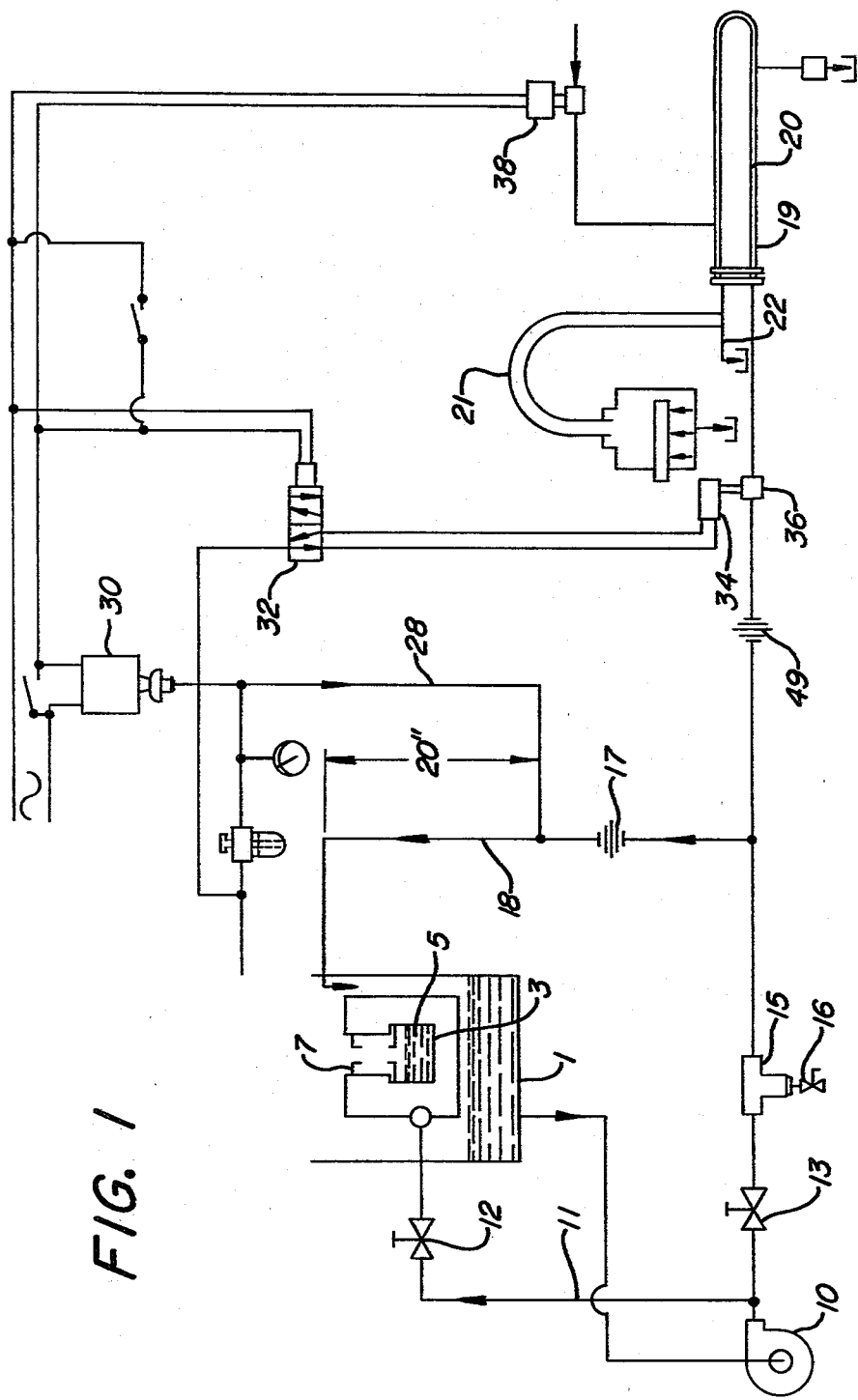

United States Patent [19]

Strong

[11] 4,402,760
[45] Sep. 6, 1983

[54] SALT RECOVERY SYSTEM FOR A LIQUID CURING MEDIUM

[75] Inventor: Grant F. Strong, Wabash, Ind.

[73] Assignee: The General Tire & Rubber Company, Akron, Ohio

[21] Appl. No.: 272,158

[22] Filed: Jun. 10, 1981

[51] Int. Cl.³ .............................................. B08B 7/04
[52] U.S. Cl. ................................ 134/10; 159/47 WL; 210/741; 210/774; 210/790; 210/805; 264/38; 264/233; 134/18
[58] Field of Search ........................... 134/12, 10, 18; 159/47 WL; 210/774, 805, 739, 741, 790; 264/37, 38, 233, 236, 347; 266/120

[56] References Cited

U.S. PATENT DOCUMENTS

| | | | |
|---|---|---|---|
| 3,888,693 | 6/1975 | Schevey et al. | 134/10 |
| 3,911,069 | 10/1975 | Fujita et al. | 264/233 |
| 4,029,450 | 6/1977 | Caser | 264/347 |
| 4,109,897 | 8/1978 | Mehrkam | 266/120 |
| 4,149,702 | 4/1979 | Foreman et al. | 266/120 |

FOREIGN PATENT DOCUMENTS 2017714 10/1979 United Kingdom .

Primary Examiner—Peter A. Hruskoci

[57] ABSTRACT

Salt is recovered in a molten state from wash water used to wash extruded rubber parts. The parts, before washing, are coated with salt because they are cured in a molten salt bath. The molten salt recovered from the wash water was fed back into the carrying tank, thus eliminating salt loss and temperature change of the tank's molten salt content.

2 Claims, 1 Drawing Figure

SALT RECOVERY SYSTEM FOR A LIQUID CURING MEDIUM

The invention relates to a salt recovery system for a liquid curing medium (LCM) used to cure continuously extruded rubber.

Liquid curing media (LCM) make it possible to extrude uncured rubber into a hot bath where it is cured by the heat of the bath. See for example U.S. Pat. No. 4,029,450 Caser (1977) and British patent application No. 2,017,714. In said known LCM processes, the heat exchange liquid consists, generally, of eutectic mixtures of inorganic salts, such as for example sodium and potassium nitrates and sodium nitrite, said mixtures being, generally stable in liquid phase in a range of temperatures from 150° and 400° C. Similar salt baths are disclosed in U.S. Pat. No. 4,109,897 Mehrkam (1978). See column 3, lines 8–27 of the Mehrkam patent. The sat baths of Mehrkam, however, are used for a different purpose i.e., to quench steel or other alloys in order to obtain the desired crystalline structure in the metal. The problems involved in quenching metals and curing rubber however, are completely different. After quenching the metal in the molten salt bath, Mehrkam washes the salt from the metal and collects the salt solution generated. This salt solution is then put into the molten salt bath. This helps to cool the bath and to add water to the bath.

Adding a salt water solution to liquid curing medium used to cure extruded rubber, however, can be disastrous. Maintaining proper temperature is critical in the molten salt bath in order to properly cure the rubber extruded through the bath. The addition of water to the bath drops the bath temperature resulting in undercure. The British patent application No. 2,017,714 points out the problem involved in adding water to a liquid curing mechanism. Quoting from that application at page 1, lines 67–74.

> That is to say, should the cleaning or cooling liquid be accidentally mixed into the heating liquid medium at a high temperature, a fierce thermal reaction will occur in the vulcanizing pipe containing said heating liquid medium and, in its extremest case, the equipment may burst or explode.

Disposing of wash solutions containing salt by dumping them down the drain also generates problems. Some of the salts employed contain potassium and sodium thiocyanates, some contain nitrates and nitrites and all contain some form of material which causes water pollution.

Other commercial salt recovery systems are complex, requiring multiple evaporator stages to recover solid salt which must be reliquified for addition to the LCM, if the LCM temperature is to be maintained. Such complex systems cost about ninety thousand dollars ($90,000.00).

The invention claimed is intended to provide a remedy to the above-described problems. It eliminates the necessity of dumping the salt solution down the sewer and it eliminates the danger of adding the salt solution to the molten salt curing medium. It eliminates the need to melt solid recovered salt for addition to the LCM.

The advantages offered by the invention are that the water is removed from the salt solution at molten salt temperatures in an evaporator separated from the curing medium and the residual molten salt is then added to the molten salt curing medium, all automatically. It is also relatively inexpensive.

One way of carrying out the invention is described in detail below with reference to drawings which illustrate only one specific embodiment in which:

FIG. 1 is a skematic diagram of the controls used to automatically recover salt from a wash bath.

The wash tank 1 and the components therein are conventional. An inner tank 3 contains water 5. A water spray 7 washes an extruded part coated with salt as it passes through tank 3. Pump 10 provides pressure in a first conduit which feeds line 11 for spray 7. Globe valve 12 controls the water pressure for line 11. Pump 10 receives its water from tank 1 through line 60. Water line from pump 10 is split with the second conduit being a recycle loop back to tank 1.

In the second conduit water passes first through globe valve 13 then through strainer 15 having a ball valve 16. After passing through strainer 15 a small amount of the water continues on the recycle loop through a ½ inch (1.27 cm) orifice union 17 having a ⅛ inch (0.32 cm) diameter hole and returns to tank 1 through stand pipe 18.

The water level indicated by line 70 in stand pipe 18 is higher than the water level in tank 1 and stand pipe 18 drains into tank 1 through line 65. The second conduit also feeds a third conduit through a ½ inch (1.27 cm) orifice union 49 having a 3/32 inch (0.24 cm) hole.

Compressed air from line 28 is also fed into the bottom of stand pipe 18 at a very low volume. The pressure of the compressed air is monitored by switch 30. When the air pressure required to bubble air through stand pipe 18 exceeds a pressure equivalent to a height of 26 inches of water, pressure closes switch 30. A pressure of 26 inches of water (6.5 K Pascals) indicates a 25% salt concentration. Switch 30 when closed causes air valve 32 to open and actuate air activator 34 which opens valve 36 which causes 1 quart (0.94 l) per minute of wash water to pass into U-tube 20 and heat exchanger 19. Switch 30 also causes steam valve 38 to open and feed 175 psi gauge steam into heat exchanger 19. At the exit of the heat exchanger, steam generated by evaporation of the wash water is passed off into steam exhaust pipe 21 and the residual salt, which is molten, is fed into trough 22 which feeds it back into the LCM tank where rubber extrudate is cured (not shown). The residual molten salt flows onto the metal wall of a trough in the LCM tank and not directly into the molten salt. This is to insure that no violent reaction will take place if a small amount of water is present in the recovered molten salt.

I claim:

1. A method for maintaining a salt concentration at less than a preselected level in a balanced recirculating aqueous system wherein salt adhering to a continuously extruded work piece which has passed through a molten salt bath is removed from said work piece by spraying said work piece with water thereby producing salt containing water, a portion of which is removed from the system and the salt content thereof concentrated and thereafter added to said balanced recirculating aqueous system, which comprises:

continuously removing a portion of said salt containing water from said system, dividing said removed portion into a major and a minor stream, returning said major stream through sprayheads to spray said extruded salt adhered work piece, passing said minor portion through a strainer to obtain a strained portion, passing said strained portion into a stand pipe and returning it to said system, monioring the salt concentration by pumping air at a predetermined pressure through salt containing water in said stand pipe, flowing a predetermined amount of salt containing water, from said strained portion into a heat exchange system when said air at said predetermined pressure will not flow through said stand pipe and activating said heat exchange system to remove water from said predetermined amount to obtain a molten salt system, removing said molten said system as a separate stream from said heat exchange system, and adding said molten salt system to said molten salt bath.

2. The method of claim 1 wherein the salt concentration level is maintained at 25 percent or less.

* * * * *

UNITED STATES PATENT AND TRADEMARK OFFICE
CERTIFICATE OF CORRECTION

PATENT NO. : 4,402,760
DATED : September 6, 1983
INVENTOR(S) : Grant F. Strong

It is certified that error appears in the above-identified patent and that said Letters Patent are hereby corrected as shown below:

Column 3, line 7, which reads "monioring" should read
---monitoring---.

Column 4, line 5, which reads "molten said system" should read ---molten salt system---.

Signed and Sealed this

Fifteenth Day of November 1983

[SEAL]

Attest:

GERALD J. MOSSINGHOFF

Attesting Officer         Commissioner of Patents and Trademarks